(12) United States Patent
Al-Rawi

(10) Patent No.: US 6,427,307 B1
(45) Date of Patent: Aug. 6, 2002

(54) LOW-HYSTERESIS COUPLING METHOD FOR ANGULAR-POSITION AND TORQUE SENSOR

(76) Inventor: Steven Al-Rawi, c/o BI Technologies Corporation, 4200 Bonita Pl., Fullerton, CA (US) 92635

( * ) Notice: Subject to any disclaimer, the term of this patent is extended or adjusted under 35 U.S.C. 154(b) by 0 days.

(21) Appl. No.: 09/737,899

(22) Filed: Dec. 15, 2000

Related U.S. Application Data

(62) Division of application No. 09/295,921, filed on Apr. 21, 1999, now Pat. No. 6,190,264.

(51) Int. Cl.[7] .............................................. G01M 19/00
(52) U.S. Cl. .............................. 29/407.05; 29/407.02; 29/434; 73/862.322
(58) Field of Search .................... 29/407.02, 407.05, 29/434; 73/862.321, 862.322; 464/23, 89, 162, 147, 150, 179, 185, 97

(56) References Cited

U.S. PATENT DOCUMENTS

| | | | |
|---|---|---|---|
| 870,106 A | 11/1907 | Jones | |
| 1,268,632 A | 6/1918 | Schauffelberger | |
| 2,407,757 A | 9/1946 | MacCallum | |
| 2,425,539 A | 8/1947 | Johnson | |
| 2,841,000 A | 7/1958 | Parks et al. | |
| 2,956,187 A | 10/1960 | Wood | |
| 3,058,321 A | 10/1962 | Aske | |
| 3,065,734 A | * 11/1962 | Molzahn | 92/128 |
| 3,071,942 A | 1/1963 | Alcaro | |
| 3,511,492 A | 5/1970 | Galbato | |
| 3,728,871 A | 4/1973 | Clijsen | |
| 3,728,896 A | 4/1973 | Sheldon et al. | |
| 3,834,182 A | 9/1974 | Trask et al. | |
| 3,859,821 A | 1/1975 | Wallace | |
| 4,125,000 A | 11/1978 | Grob | |
| 4,183,258 A | 1/1980 | Stephan | |
| 4,222,246 A | 9/1980 | Rongley | |
| 4,317,339 A | 3/1982 | Schmidt | |
| 4,357,137 A | 11/1982 | Brown | |
| 4,464,141 A | 8/1984 | Brown | |
| 4,613,030 A | 9/1986 | Maycock et al. | |
| 4,706,353 A | * 11/1987 | Zgliczynski et al. | 29/888.025 |
| 4,724,711 A | 2/1988 | Sakakibara et al. | |
| 4,776,074 A | * 10/1988 | Suzuki et al. | 29/888.012 |
| 4,800,974 A | 1/1989 | Wand et al. | |
| 4,865,143 A | 9/1989 | Hashimoto et al. | |
| 5,195,382 A | 3/1993 | Peilloud | |
| 5,267,903 A | 12/1993 | Kuribayashi | |
| 5,438,172 A | 8/1995 | Fowler et al. | |
| 5,442,956 A | 8/1995 | Persson | |
| 5,460,574 A | 10/1995 | Hobaugh | |
| 5,501,110 A | 3/1996 | Peilloud et al. | |

(List continued on next page.)

Primary Examiner—S. Thomas Hughes
Assistant Examiner—Essama Omgba
(74) Attorney, Agent, or Firm—Oppenheimer Wolff & Donnelly LLP

(57) ABSTRACT

An angular-position and torque sensor assembly includes a low-hysteresis coupling for an assembly including a plurality of shafts. The coupling comprises an inner member, an outer member, and a base member disposed outside the outer member. The inner member and base member are coupled to the shafts. First rails connect the inner member to the outer member, and the first rails allow the inner member to be readily displaced relative to the outer member only in a direction substantially perpendicular to a longitudinal axis of the first rails. Second rails connect the outer member to the base member, and the second rails are aligned perpendicular to the first rails. The second rails allow the outer member to be readily displaced relative to the base member only in a direction substantially perpendicular to a longitudinal axis of the second rails. Due to the connection means of the first and second rails, the inner member is free to move in an x-y direction relative to the base member in an x-y plane parallel to the surface of the base while being rotatively fixed in a z axis relative to the base member.

33 Claims, 11 Drawing Sheets

U.S. PATENT DOCUMENTS

| | | | |
|---|---|---|---|
| 6,112,837 A | | 9/2000 | Kanno et al. |
| 6,117,016 A | * | 9/2000 | Nett et al. .................... 464/87 |
| 6,123,620 A | * | 9/2000 | Polakowski .................. 464/73 |
| 6,162,125 A | * | 12/2000 | Robertson et al. ............ 464/89 |
| 6,168,527 B1 | * | 1/2001 | Geislinger ................... 464/88 |
| 6,170,340 B1 | * | 1/2001 | Horiuchi et al. ........ 73/862.321 |
| 6,171,195 B1 | * | 1/2001 | Ferguson ................... 464/137 |
| 6,190,264 B1 | * | 2/2001 | Al-rawi ...................... 464/185 |
| 6,217,453 B1 | * | 4/2001 | Thompson ................... 464/89 |
| 6,234,910 B1 | * | 5/2001 | Norberg .................... 464/182 |
| 6,257,075 B1 | * | 7/2001 | Bachnak ................ 73/862.322 |
| 6,261,182 B1 | * | 7/2001 | Chino et al. .................. 464/89 |
| 6,296,096 B1 | * | 10/2001 | Chludek ................. 192/58.41 |

* cited by examiner

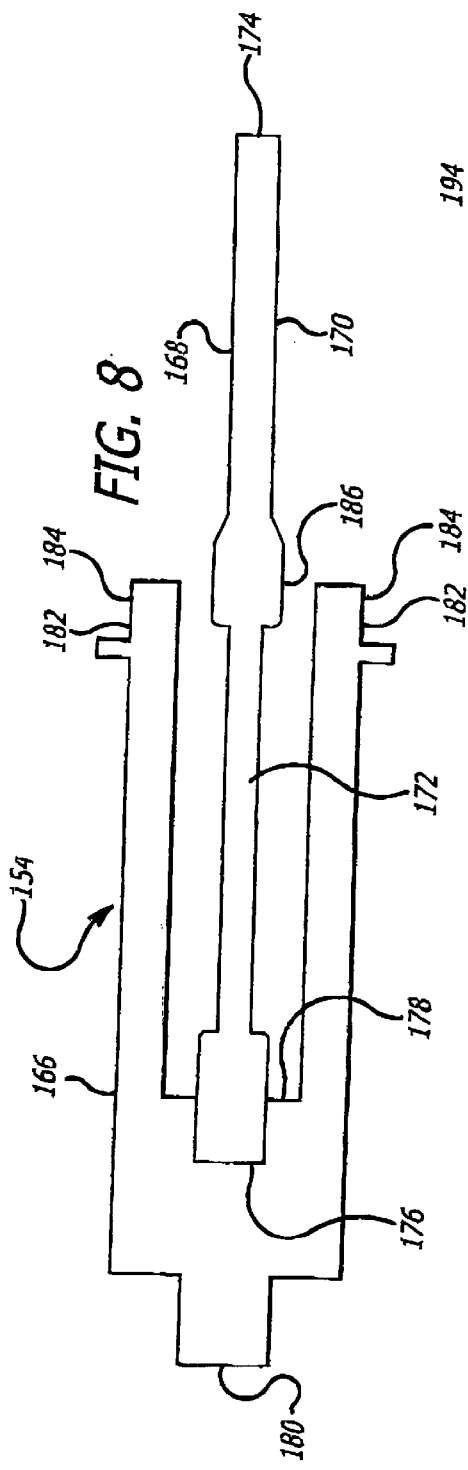
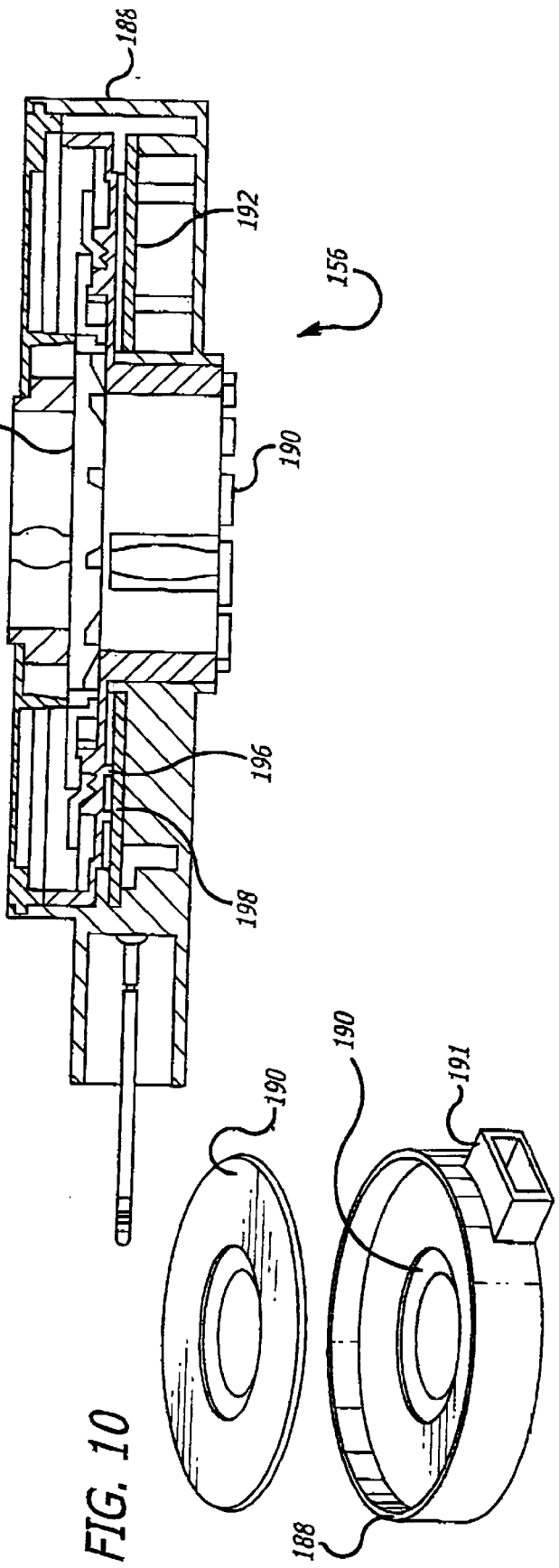
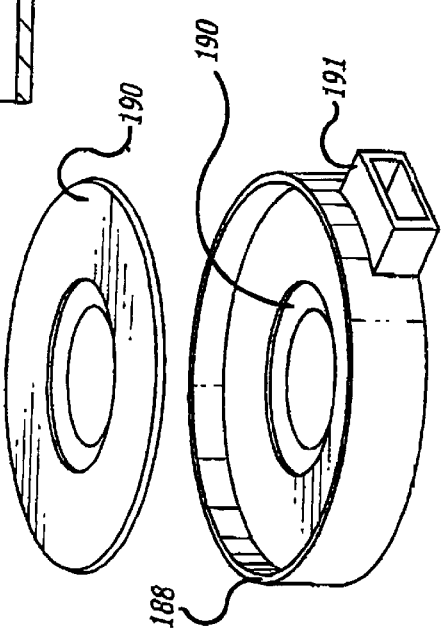
FIG. 8
FIG. 9
FIG. 10

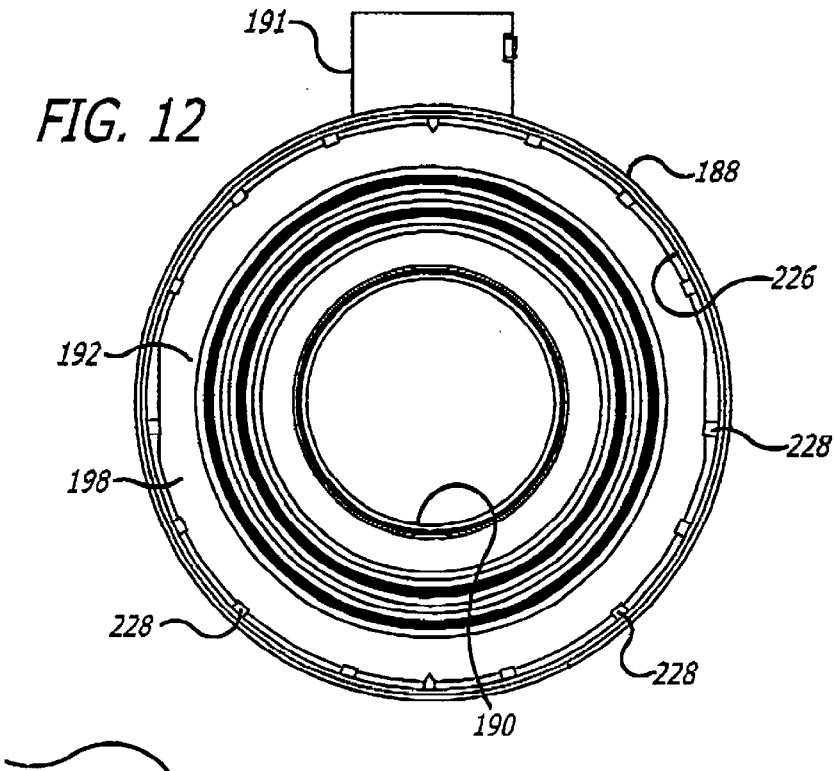
*FIG. 12*
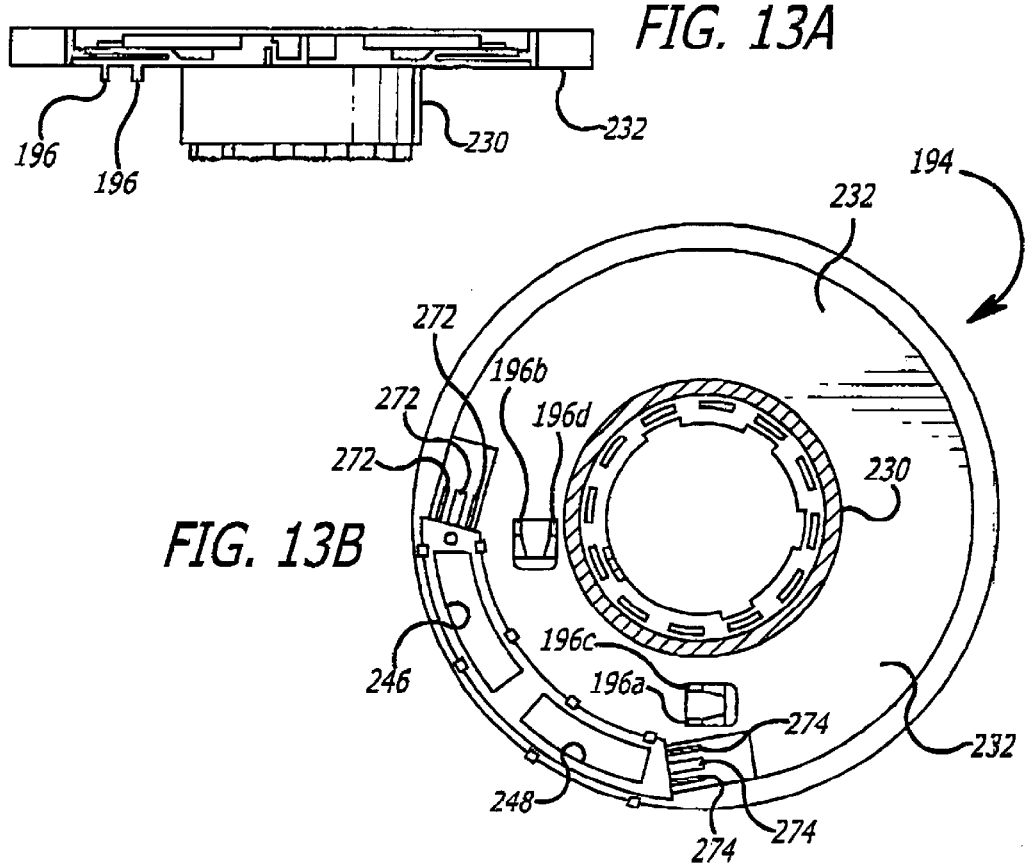
*FIG. 13A*
*FIG. 13B*

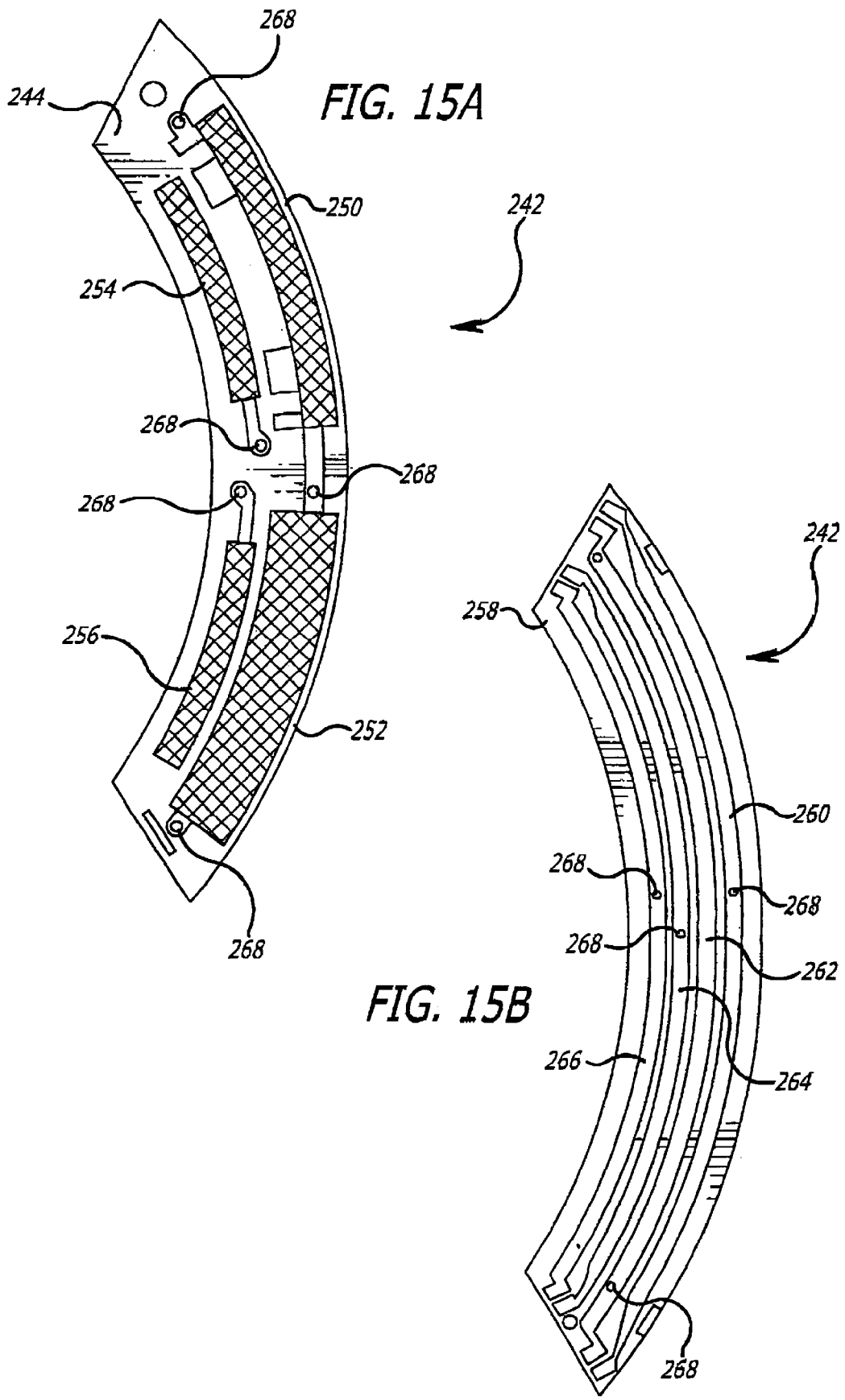

LOW-HYSTERESIS COUPLING METHOD FOR ANGULAR-POSITION AND TORQUE SENSOR

CROSS-REFERENCE TO RELATED APPLICATIONS

This application is a divisional of U.S. patent application Ser. No. 09/295,921, filed Apr. 21, 1999, now U.S. Pat. No. 6,190,264, which is herein incorporated by reference.

FIELD OF THE INVENTION

The invention relates generally to a low-hysteresis coupling for a shaft

BACKGROUND OF THE INVENTION

There are many applications which require a coupling to couple a device to a shaft. Often, such couplings allow rotational movement of a shaft to be transferred to a device while not allowing translational movement of the shaft to be transferred to the device. In certain application, the coupling must substantially eliminate hysteresis (which is the lagging of a physical effect on a body behind its cause) in rotational movement of the shaft with respect to the device.

One application of the coupling is a torque sensor device which determines a torque input on a shaft which comprises a torsion bar longitudinally connected to a primary bar. The primary bar is relatively inflexible to a torque input, while the torsion bar torsionally flexes to a torque input. The magnitude of the torque input may be determined by measuring the rotation of the torsion bar relative to the primary bar. One of the difficulties in coupling the torsion bar to the primary bar is that the torsion and primary bar may not be coaxial due to manufacturing tolerances or design requirements. External forces acting perpendicularly to the longitudinal axis of the torsion bar may also cause translation of the torsion bar in an x-y direction of an x-y plane (which is perpendicular to the longitudinal axis of the torsion and primary bar) such that the torsion bar may become temporarily non-coaxial with the primary bar. In addition to connecting with non-coaxial bars, the coupling should transmit the relative rotation of the torsion bar to the torque sensor device without backlash. In other words, the coupling allows rotational movement of the shaft to be transferred to a device while not allowing translational movement of the shaft to be transferred to the device. Thus, the coupling substantially eliminates hysteresis in rotational movement of the primary bar with respect to the torque sensor device.

The torque sensor device may be used to accurately measure the input torque acting on a steering column shaft in an electronic power steering system of an automobile or truck. In this application, an input torque acts on the steering column shaft when an operator turns the steering wheel. The steering column shaft includes the primary bar and the torsion bar. The rotation of the torsion bar relative to the primary bar may be measured with a potentiometer. The torque sensor device may include a coupling which couples the torsion bar to the primary bar so that a sensor brush may slidingly contact a variable resistor as the torsion bar rotates relative to the primary bar. In order to accurately determine the relative rotation of the torsion bar, the coupling should accurately transfer the relative rotation of the torsion bar to the sensor brush with substantially no hysteresis and still allow the translation of the torsion bar in the x-y plane.

Several devices are currently available which couple non-coaxial shafts. However, none of the devices thus far appear to be without problems. One attempt to satisfy the needs discussed above is disclosed in U.S. Pat. No. 3,834,182 (Trask et al.). Referring to FIGS. 1 and 2, this patent describes a flexible coupler 20 for connecting nominally coaxial shafts drivingly connected to one another. The coupler 20 permits a limited amount of axial misalignment between the shafts. The coupler 20 comprises three basic elements: an enlarged cylindrical hub 22 fixed to a first shaft, a second smaller cylindrical flange 26 fixed to another shaft 28 in juxtaposition to the hub 22, and a "floating" annular ring 30 also juxtaposed with the hub 22 about the flange 26. Loose fitting complementary axial lugs 32 and notches 34 interconnect the hub 22 and ring 30, and loose fitting complementary radial lugs 36 and notches 38 are interfitted between the ring 30 and flange 26. The flange 26 and ring 30 are located relative to the hub 22 for axial clearance, permitting limited angular misalignment between the two shafts 24, 28. The flange 26 and circumjacent ring 30 form a planar surface juxtaposed with the inner planar surface 40 of the hub 22. However, due to the loose fitting complementary axial lugs 32 and notches 38 and the loose fitting complementary radial lugs 36 and notches 38, gaps 42 between the lugs 32 and notches 34 may lead to rotational play between the first and second shaft 24, 28.

U.S. Pat. No. 2,956,187 (Wood), U.S. Pat. No. 3,859,821 (Wallace), U.S. Pat. No. 4,357,137 (Brown), and U.S. Pat. No. 4,464,141 (Brown) appear to provide a coupling with less rotational play between a first and second shaft than the Trask patent. These patents describe a flexible coupling for transmitting power from a drive shaft to a driven shaft. The coupling includes a primary coupling member having a hub section for receiving and rotating with a first shaft, a flange section having a resilient insert therein, and a secondary coupling member located centrally within the resilient insert for receiving and rotating with a second shaft. The resilient insert is interference fitted into the primary coupling member, and the secondary coupling is interference fitted into the central region of the resilient insert The resilient insert is adequately flexible to allow for axial misalignments between the shafts. However, a slight rotational play appears to exist between the first and second shafts because the resilient insert flexes to an input torque acting on the shafts.

Another coupling with reduced rotational play is disclosed in U.S. Pat. No. 3,728,871 (Clijsen) which describes a coupling for connecting two approximately registering shafts. Referring to FIGS. 3 and 4, the coupling 50 comprises two connecting pieces 52, 54 respectively connected to a first 56 and second shaft 58. A loose coupling disc 60 is fitted between the two connecting pieces 52, 54 and couples the rotary movements of both connecting pieces 52, 54 to each other and has a limited play in two mutually perpendicular radial directions with respect to the individual connecting pieces 52, 54. Play in the direction of rotation is reduced by a resilient C-shaped spring member 62. One drawback of this coupling 50 appears to be that it is relatively complicated. This may result in an increase in manufacturing time and cost due to the numerous precision shaped components required. It also may result in a less reliable device because the inclusion of more components may translate into a statistically less reliable device.

Another coupling with reduced rotational play is a conventional Oldham coupling.

Referring to FIG. 5, the Oldham coupling 100 comprises three basic elements: a first member 102 connected to a first shaft at one end and having an axially extending tongue 104 at the other end, a second member 106 connected to a second shaft at one end and an axially extending tongue 108 at the other end, and a third member 110 positioned between the first member 102 and the second member 106. The third member 110 has a groove 112 at each end which slidingly mates with the respective tongues 104, 108. One drawback of the Oldham coupling 100 is that it appears to be relatively complicated. For the same reasons discussed above in regards to the Clijsen patent, the Oldham coupling may not satisfy certain needs for the torque sensor device.

Thus, there remains a need for a coupling that allows rotational movement of a shaft to be transferred to a device while not allowing translational movement of the shaft to be transferred to the device in an inexpensive, reliable, and rugged manner.

BRIEF SUMMARY OF THE INVENTION

In accordance with the present invention, a coupling is coupled to a device in a manner that allows rotational movement of a shaft to be transferred to a device while not allowing translational movement of the shaft to be transferred to the device. The coupling is particularly suited for any device which requires substantially no hysteresis in rotational movement of the shaft with respect to the device. The present invention achieves the objective of coupling a shaft to a device in an inexpensive, reliable, and rugged manner.

The coupling of the present invention is particularly useful in an angular-position and torque sensor assembly for an electronic power assisted rack and pinion steering system of an automobile or truck. The steering system includes a steering wheel, column shaft, sensor assembly, steering gear, servo motor, pinion, and rack. The steering wheel is coupled to one end of the column shaft, and the opposite end of the column shaft is coupled to the steering gear. The other end of the steering gear is connected to a pinion which is rotatively coupled to the rack such that an operator turning the steering wheel causes the pinion to rotate along the rack. The rack moves longitudinally and turns the tires of the automobile. The servo motor is connected to the steering gear to provide power assist. The sensor assembly is coupled to the column shaft and accurately determines the angular position of the column shaft and input torque acting on the column shaft by the operator turning the steering wheel. Based on the data received from the sensor assembly, the controller processes the data and directs the rotational direction and power output of the servo motor such that a larger input torque results in providing more power to the servo motor. Thus, the steering system provides an appropriate level of power assistance to aid in steering.

Generally, in accordance with an exemplary illustrative embodiment of the present invention, the sensor assembly may comprise (1) a position substrate having a slip ring and a variable resistor ring, (2) a first rotating member rotating about the position substrate and having an electrical contact on the bottom side and a second variable resistor on the top side, and (3) a second rotating member rotating about the first rotating member and having a coupling on the top side and an electrical contact on the bottom side such that the electrical contact of the second rotating member slidingly contacts the second variable resistor.

The coupling comprises an inner member, an outer member, and a base member disposed outside the outer member. First rails connect the inner member to the outer member, and the first rails are aligned substantially perpendicular to a reference axis (the reference axis is on an x-y plane substantially parallel to the top surfaces of the inner member, outer member, and base member) to allow the inner member to be readily displaced relative to the outer member only in a direction substantially parallel to the reference axis. Second rails connect the outer member to the base member, and the second rails are aligned substantially parallel to the reference axis to allow the outer member to be readily displaced relative to the base member only in a direction substantially perpendicular to the axis. Due to the configuration of the first and second rails, the inner member is free to move relative to the base member in an x-y direction of the x-y-plane while being rotatively fixed in a z axis which is perpendicular to the x-y plane.

Other objects, features, and advantages of the present invention will become apparent from a consideration of the following detailed description

BRIEF DESCRIPTION OF THE SEVERAL VIEWS OF THE DRAWINGS

FIG. 8 is a schematic cross-sectional view taken through the column shaft along line 7—7 of FIG. 7;

FIG. 9 is a cross-sectional view of the sensor assembly of FIG. 7;

FIG. 10 is a-perspective view of a housing and rear lid for the sensor assembly shown in FIG. 7;

FIG. 12 is a top view of the element assembly shown in FIGS. 11A and 11B attached to the housing shown in FIG. 10;

FIG. 13A is a cross-sectional view of a position rotor for the sensor assembly shown in FIG. 7;

FIG. 13B is a bottom view of the position rotor shown in FIG. 13A;

FIG. 15A is a top view of a torque element for the position rotor shown in FIGS. 14A and 14B;

FIG. 15B is a bottom view of the torque element shown in FIG. 15A;

DETAILED DESCRIPTION OF THE PREFERRED EMBODIMENTS

Figure 1:
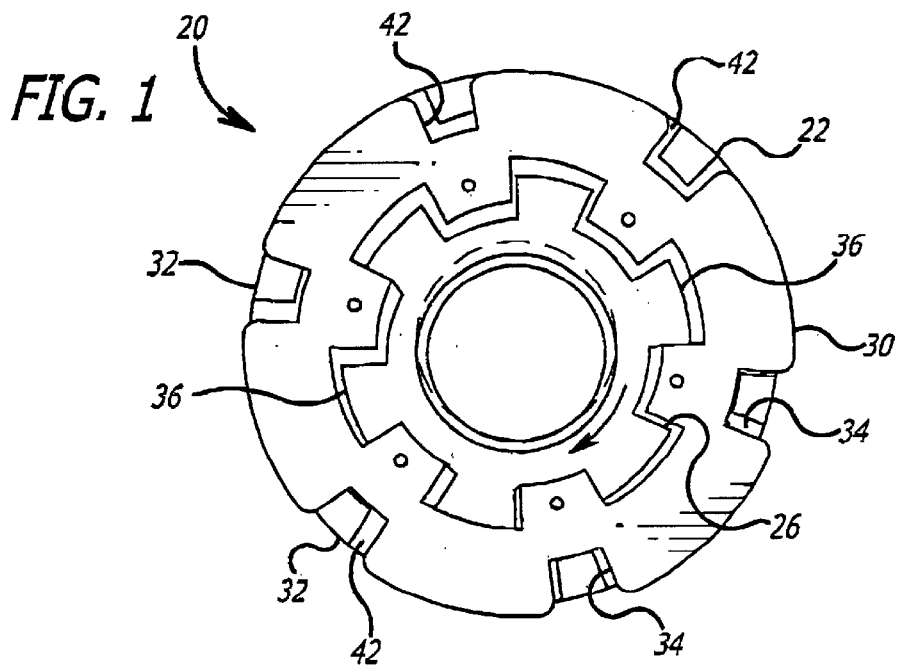
FIG. 1 is a top view of a prior art flexible coupling.

The present invention relates to a low-hysteresis coupling for a shaft. The coupling of the invention may be thought of (in Cartesian coordinates) as allowing rotational movement of a shaft about a z axis to be transferred to a device while not allowing translational movement of the shaft in an x-y plane to be transferred to the device. In certain applications, the coupling substantially eliminates hysteresis in rotational movement of the shaft with respect to the device. In the particular embodiment shown in the drawings and herein described, the shaft is coupled to an angular-position and torque sensor assembly for a motor vehicle such as an automobile or truck. However, it should be understood that the principles of the invention are equally applicable to virtually any form of shaft For example, the low hysteresis coupling may be used for a steering system in aircraft, boats, or other vehicles. In addition, the low hysteresis coupling may be used in test equipment, robotics, manufacturing equipment, or any other device requiring the coupling of non-coaxial shafts. Therefore, the present invention should not be limited to the specific embodiment shown and such principles should be broadly construed.

Figure 6:
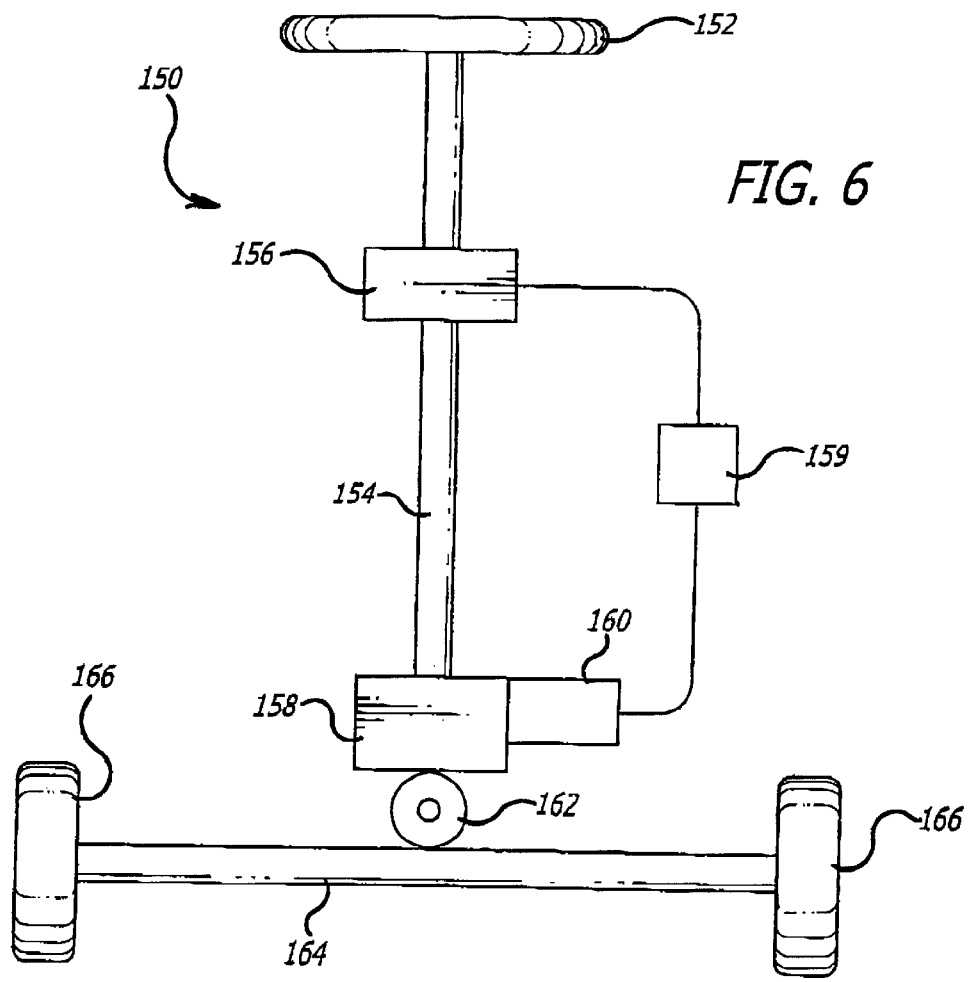
FIG. 6 is a block diagram musing the main components of a steering assembly for a motor vehicle utilizing a coupling in accordance with the present invention.

Referring to FIG. 6, a block diagram of an electronic power assisted rack and pinion steering system 150 for an automobile or truck utilizing a low hysteresis coupling of the present invention is illustrated. The steering system 150 includes a steering wheel 152, column shaft 154, sensor assembly 156, steering gear 158, servo motor 160, controller 159, pinion 162, and rack 164, and tires 166. The steering wheel 152 is coupled to one end of the column shaft 154, and the opposite end of the column shaft 154 is coupled to the steering gear 158. The other end of the steering gear 158 is connected to the pinion 162 which is rotatively coupled to the rack 164 such that an operator turning the steering wheel 152 causes the pinion 162 to rotate along the rack 164. The rack 164 moves longitudinally and turns the tires 166 of the automobile. The servo motor 160 is connected to the steering gear 158 to provide power assist. The sensor assembly 156 is coupled to the column shaft 154 and accurately determines the angular position of the column shaft 154 and the input torque acting on the shaft 154 when the operator turns the steering wheel 152. The sensor assembly 156 is electrically coupled to the controller 159. Based on the data from the sensor assembly 156, the controller 159 processes the data and directs the rotational direction and power output of the servo motor 160 such that a larger torque input results in providing more power to the servo motor 160. Thus, the steering system 150 provides an appropriate level of power assistance to aid in steering.

Many other types of power steering systems exist such as a recirculating ball system comprising a steering gear in the form of a recirculating ball unit. The recirculating ball unit is connected to the column shaft at one end and to an idler arm at the other end. The idler arm is connected to a center link, and the center link is connected to the wheels of the automobile or truck. The present invention is intended to work equally well with either type of power steering system.

Figure 7:
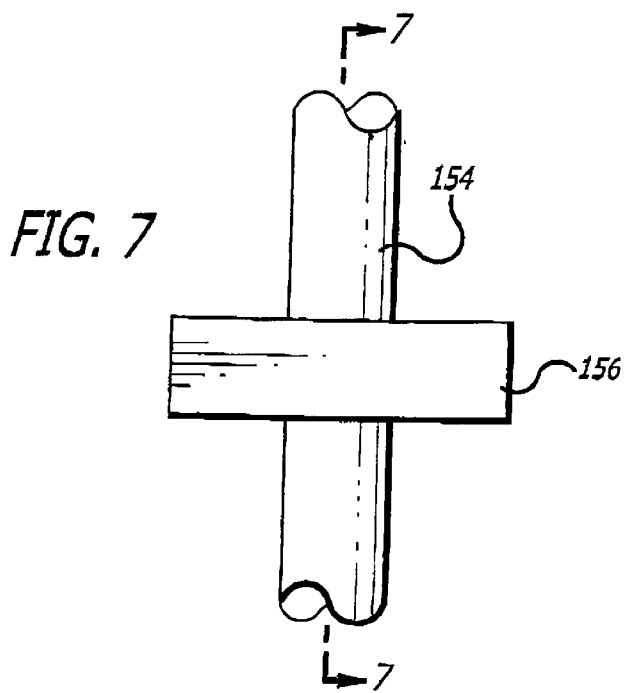
FIG. 7 is a perspective view of an exemplary embodiment of a sensor assembly coupled to a column shaft by a coupling in accordance with the present invention.

Referring to FIGS. 7–9, the sensor assembly 156 is shown coupled to the column shaft 154. The column shaft 154 may include a primary bar 166 and a torsion bar 168. A portion of the primary bar 166 is hollow so that it may accept a portion of the torsion bar 168. The primary bar 166 has a length of about 9 inches, an outer diameter of about 1 inch, and a bore diameter slightly larger than 0.6 inch. The torsion bar 168 has a length of about 11 inches and includes a thick portion 170 and a thin portion 172. The thick portion 170 has a length of about 6½ inches and a diameter of about 0.6 inch, and the thin portion 172 has a length of about 4½ inches. In the embodiment shown in the drawings, the thick 170 and thin portions 172 of the torsion bar 168 are integrally formed. A first end 174 of the torsion bar 168 is connected to the steering wheel 152, while the second end 176 is connected to an inner end portion 178 of the primary bar 166. The second end 180 of the primary bar 166 is connected to the steering gear 158. The first end 182 of the primary bar 166 includes a first adapter 184 for coupling with the sensor assembly 156. In a similar fashion, the thick portion 170 of the torsion bar 168 (near the connection of the thick 170 and thin portion 172) includes a second adapter 186 for coupling with the sensor assembly 156. The first 184 and second adapter 186 are positioned adjacent to each other.

Figure 2:
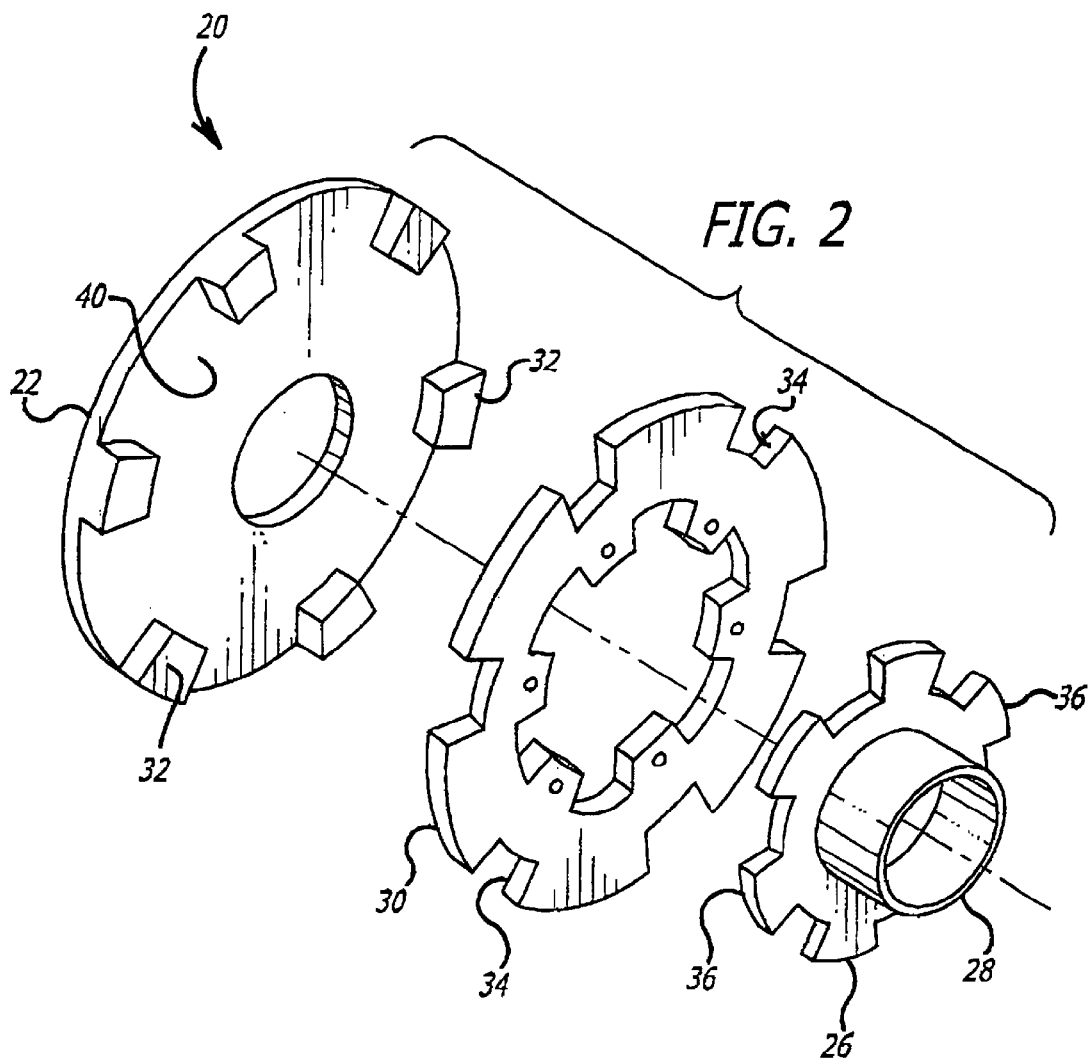
FIG. 2 is an exploded perspective view of the prior art flexible coupling of FIG. 1.
Figure 3:
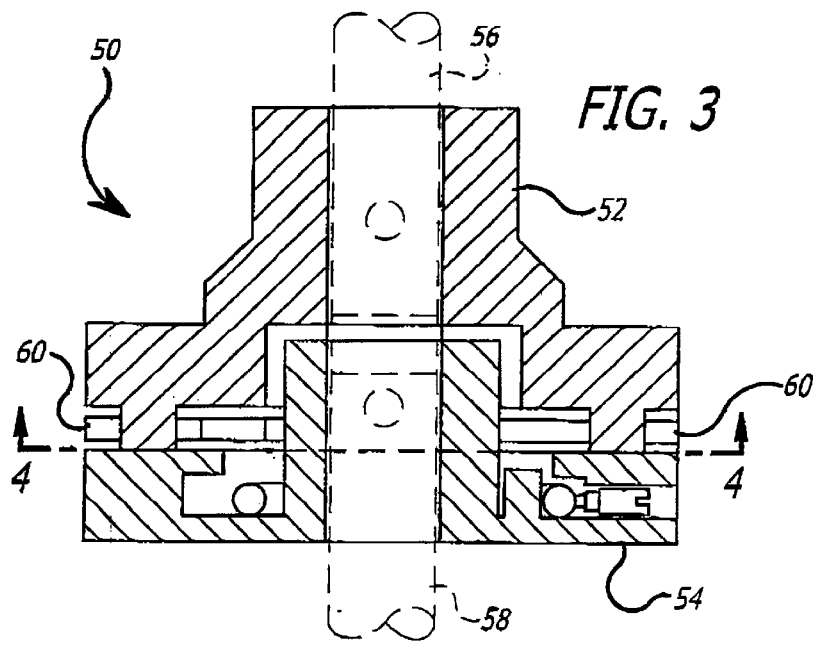
FIG. 3 is a cross-sectional view of another prior art coupling.
Figure 4:
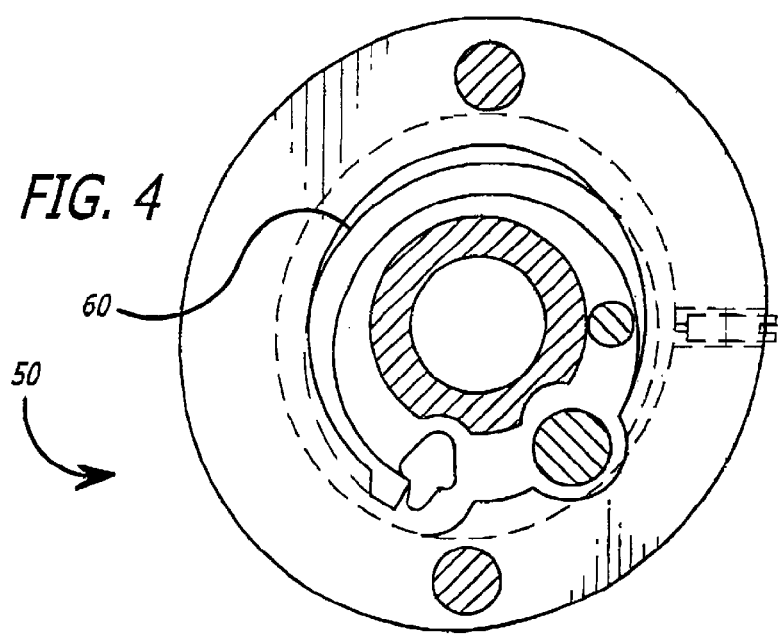
FIG. 4 is a cross-sectional view of the prior art coupling of FIG. 3 along line 4—4.
Figure 5:
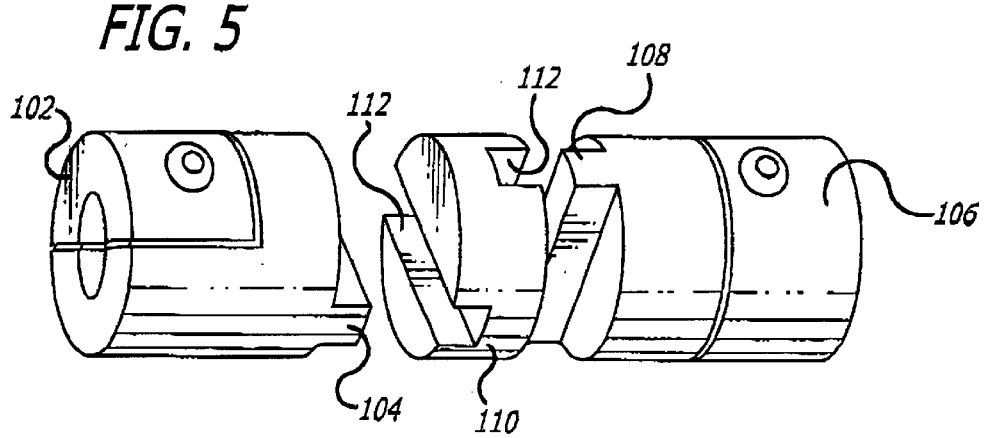
FIG. 5 is an exploded perspective view of a prior art Oldham coupling.

In the embodiment shown in the drawings, the column shaft 154 is formed of a substantially solid and continuous construction. Preferably, the column shaft 154 is made from a high strength metal such as carbon steel. It should be noted that other materials exhibiting similar qualities may also be used to form the column shaft such as aluminum, titanium, magnesium, polymers, and the like. The column shaft may be sized and shaped in other forms to accommodate different purposes. For typical automobiles, a relatively short and thin column shaft would be preferable such as the embodiment shown in FIGS. 2–4. Larger and thicker column shafts would be more appropriate for larger vehicles such as trucks and off-road vehicles requiring heavy duty column shafts. The column shaft may also be configured with a non-circular cross-section such as a square, oval, octagon, or any other shape.

The sensor assembly 156 includes an angular-position sensing unit and a torque sensing apparatus enclosed in a housing 188 and a rear lid 189. Referring to FIG. 10, the housing 188 is disc shaped with a centrally located circular opening 190 which accepts and engages with the first 184 and second adapter 186 of the column shaft 154. The housing 188 has an outer diameter of about 3 inches and a thickness of 0.7 inch The opening has a diameter of about 1 inch.

The housing 188 includes a rectangularly shaped interface portion 191 protruding outwardly from the disc shaped housing. The interface portion 191 accepts a wiring harness (not shown) which includes a plurality of wires which interconnect the sensor assembly to the controller.

Figure 11:
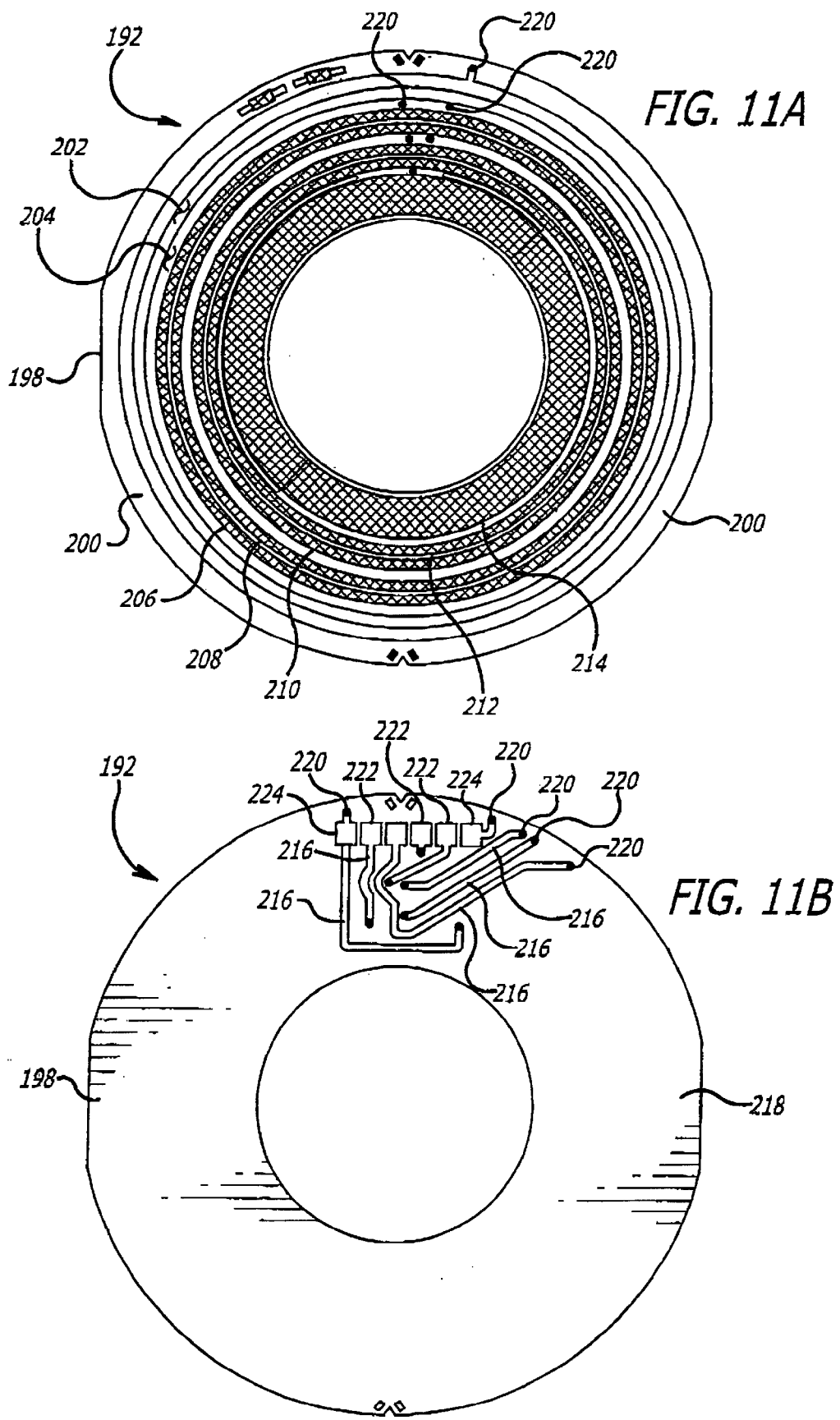
FIG. 11A is a top view of an element assembly for the sensor assembly shown in FIG. 7.
FIG. 11B is a bottom view of the element assembly for the sensor assembly shown in FIG. 7.

Referring to FIG. 9, the angular-position sensing unit includes a circular potentiometer which determines the angular position of the column shaft 154. The potentiometer comprises an element assembly 192, a position rotor 194, and a plurality of position sensor brushes 196. The element assembly 192 includes a position substrate 198 formed from alumina and has a diameter of about 3 inches and a thickness of about 40 mils. Referring to FIG. 11A, the top side 200 of the position substrate 198 includes a first 202 and second slip ring 204 and further includes a first 206, second 208, third 210, fourth 212, and fifth resistive ring 214. The slip rings 202, 204 and resistive rings 206, 208, 210, 212, 214 are formed using conventional thick film processes, wherein the slip 202, 204 and resistive rings 206, 208, 210, 212, 214 are screen patterned onto the top surface of the position substrate, dried, and then fired. The slip rings are burnished to form a smooth surface to reduce wearing of the position sensor brushes 196 as they slidingly contact the slip rings 202, 204. The resistive rings 206, 208, 210, 212, 214 are formed from a resistor ink blend to achieve a nominal film resistivity of 197 ohms/square. Each resistive ring 206, 208, 210, 212, 214 is electrically interconnected with the two slip rings 202, 204. In the embodiment shown in the drawings, the following respective resistance values are achieved for the resistive rings 206, 208, 210, 212, 214: 2640 ohms, 2790 ohms, 3000 ohms, 3180 ohms and 3390 ohms.

Referring to FIG. 11B, a plurality of termination patterns 216 are formed on the bottom side 218 of the position substrate 198. The plurality of termination patterns 216 interconnect the various components of the angular-position sensing unit such as the plurality of position sensor brushes 196, slip rings 202, 204, and resistive rings 206, 208, 210, 212, 214 with the controller 159. The plurality of termination patterns 216 are formed using conventional thick film processes. Each of the termination patterns 216 are electrically connected to their respective slip rings 202, 204 and resistive rings 206, 208, 210, 212, 214 by trough holes 220 formed through the position substrate 198. The termination patterns 216 comprise silver ink screen printed onto the bottom side 218 of the position substrate 198, dried, and fired. Each end 222 of the termination patterns 216 is connected to a terminal clip 224 using solder paste.

Referring to FIG. 12, the element assembly 192 is attached to the inner surface 226 of the housing 188. In the embodiment shown in the drawings, the housing 188 includes a plurality of tabs 228 extending outwardly from the inner surface 226 of the housing 188. The plurality of tabs 228 are positioned adjacent to the peripheral edges of the position substrate 198, and the plurality of tabs 228 extend beyond the top surface of the position substrate 198. The element assembly 192 is heat staked onto the housing 188 by melting the top portion of the each of the tabs 228 onto the top surface of the position substrate 198.

Figure 13C:
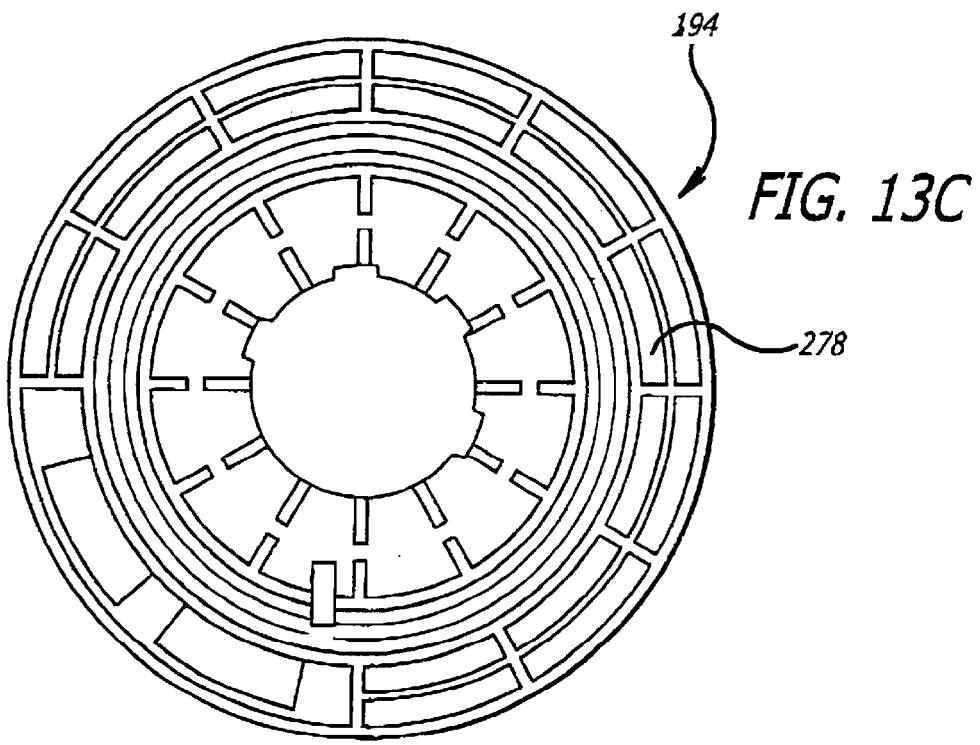
FIG. 13C is a top view of the position rotor shown in FIG. 13A.

Referring to FIGS. 13A, 13B and 13C, the position rotor 194 is substantially a disc shaped member with a hub 230 extending outwardly from the bottom side 232. The position rotor 194 is rotatably mounted to the housing 188 such that the circular opening 190 of the housing 188 accepts the hub 230 of the position rotor 194. The position rotor 194 is electrically interconnected to the position substrate 198 by the plurality of position sensor brushes 196 which include a first 196a, second 196b, third 196c, and fourth sensor brush 196d attached to the bottom side 232 of the position rotor 194. The first 196a and second sensor brush 196b slidingly contact the third 210 and fourth resistive ring 212 respectively, while the third 196c and fourth sensor 196d brush slidingly contact the fifth resistive ring 214.

Figure 14C:
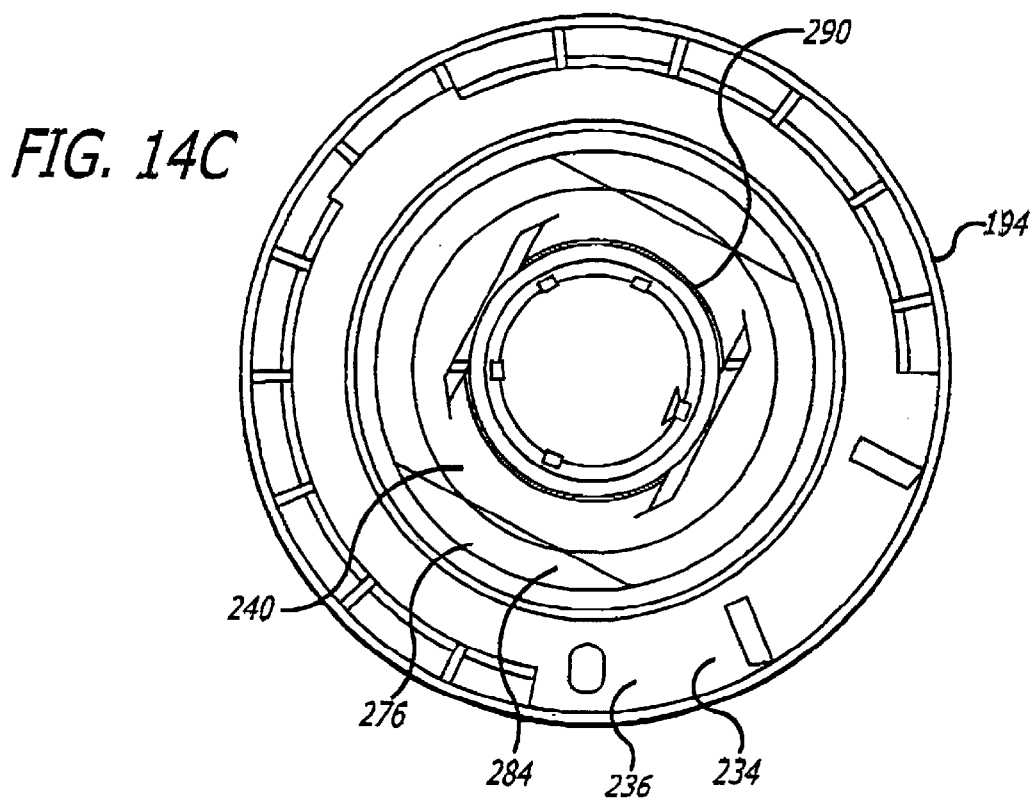
FIG. 14C is a top view of the rotor assembly shown in FIGS. 14A and 14B.
Figure 14A:
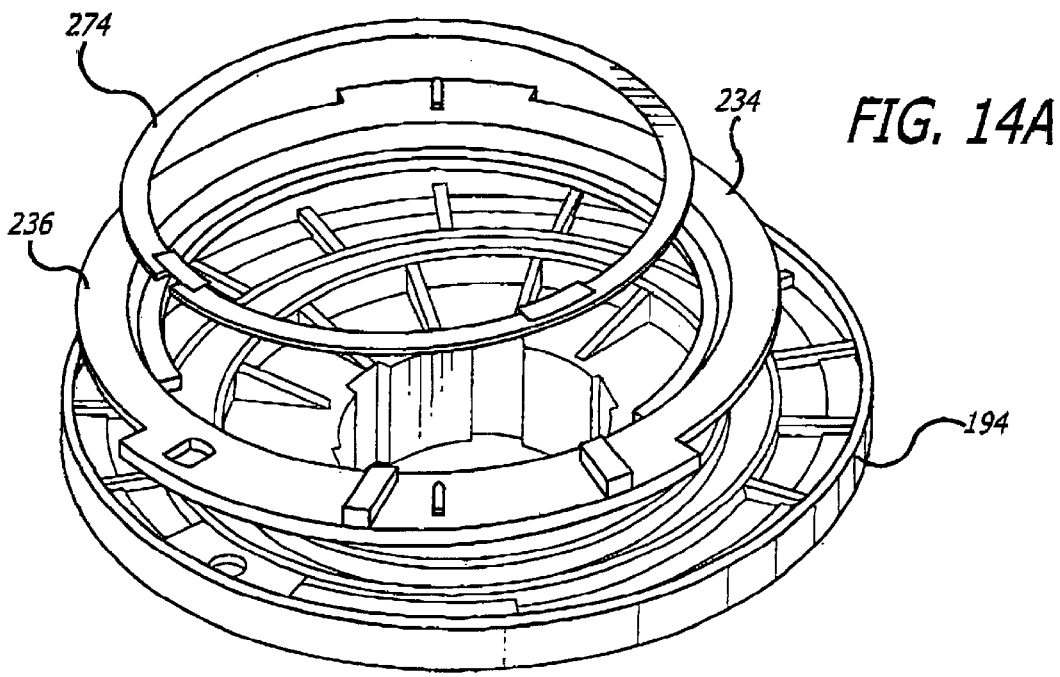
FIGS. 14A and 14B are exploded perspective views of a rotor assembly for the sensor assembly shown in FIG. 7.
Figure 14B:
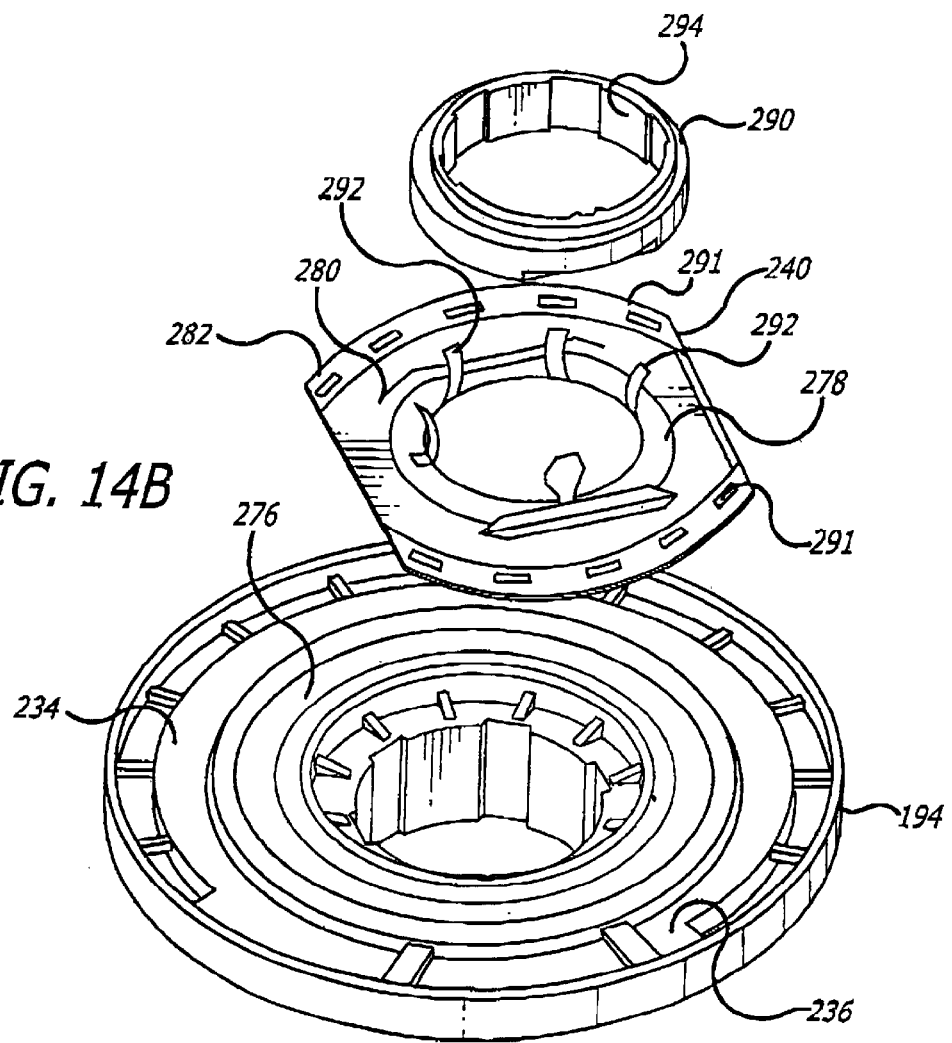

Referring to FIGS. 14A, 14B and 14C, the torque sensing unit includes a potentiometer which determines the angular position of torsion bar 168 relative to the angular position of the primary bar 166. The potentiometer for the torque sensing unit comprises a torque element 234, the position rotor 194, a rotor ring 236, a plurality of torque sensor brushes 238, a coupling 240, and a torque rotor 290.

Referring to FIGS. 15A and 15B, the torque element 234 includes a torque substrate 242 which is crescent shaped and formed from alumina. The torque substrate 242 has a width of about 0.3 inch and a thickness of about 25 mils. The torque substrate 242 is attached to the bottom side 232 of the position rotor 194, and a portion of the top side 244 of the torque substrate 242 is exposed through a first 246 and second opening 248 formed in the position rotor 194.

A first 250, second 252, third 254, and fourth resistive pattern 256 is formed on the top side 244 of the torque substrate 242. These resistive patterns 250, 252, 254, 256 are formed using conventional thick film processes. The bottom side 258 of the torque substrate 242 includes a first 260, second 262, third 264 and fourth termination pattern 266 which interconnect the plurality of resistive patterns 250, 252, 254, 256 to the various components of the torque sensing unit such as the plurality of torque sensor brushes 238, slip rings 202, 204, and resistive rings 206, 208, 210, 212, 214 with the controller 159. The termination patterns 260, 262, 264, 266 comprise thick film silver and are formed using conventional thick film processes. Each of the termination patterns 260, 262, 264, 266 are interconnected to their respective resistive patterns 250, 252, 254, 256 by trough holes 268 formed through the torque substrate 242. Each end 270 of the plurality of termination patterns 260, 262, 264, 266 is connected to a torque sensor brush 272 at one end and by another torque sensor brush 274 at the other end so that the first 260, second 262, third 264, and fourth termination pattern 266 are respectively interconnected with the first slip ring 202, second slip ring 204, first resistive ring 206, and second resistive ring 208 (see FIG. 13B).

Figure 16:
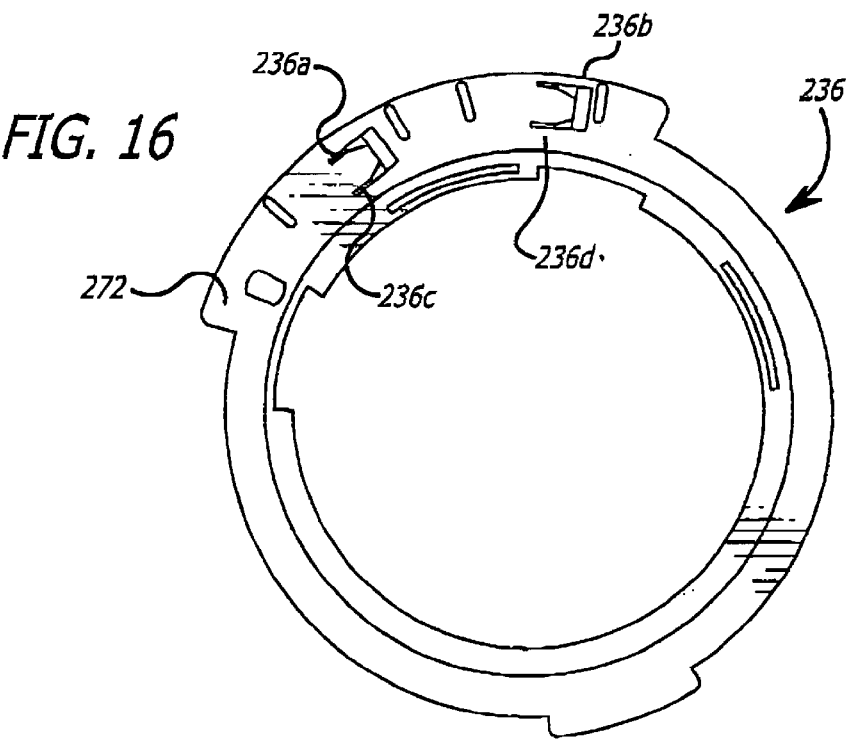
FIG. 16 is a bottom view of a coupling ring assembly for the rotor assembly shown in FIGS. 14A and 14B.

Referring to FIGS. 14A and 16, the rotor ring 236 has an outer diameter of about three inches and is rotatively mounted to the top side 278 of the position rotor 194 so that the rotor ring 236 is able to rotate relative to the position rotor 194. A first 238a, second 238b, third 238c, and fourth torque sensor brush 238d are attached to the bottom side 272 of the rotor ring 236 and slidingly contact the first 250, second 252, third 254, and fourth resistive pattern 256, respectively. The rotor ring 236 is held in place by a retaining ring 274, and the retaining ring 274 is covered by an adapter ring 276. Both the retainer ring 274 and adapter ring 276 are formed from 7075-T6 aluminum.

Figure 17:
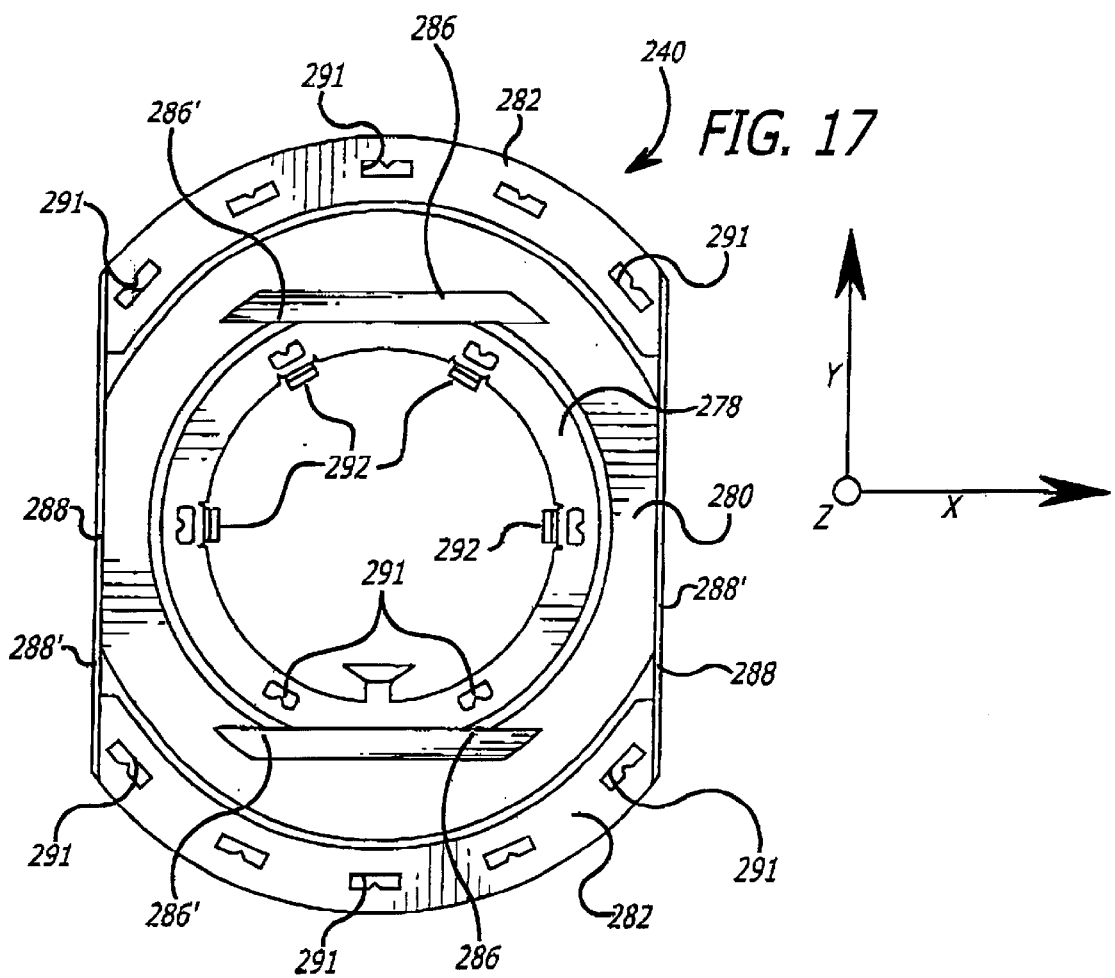
FIG. 17 is a top view of a CV ring for the rotor assembly shown in FIGS. 14A–14C.

Referring to FIGS. 14B and 17, the coupling 240 has an inner ring member 278, outer ring member 280, and a base ring member 282. The inner ring member 278 is connected to the outer ring member 280 which, in turn, is connected to the base ring member 282. The base ring member 282 is fixedly secured to the top side 284 of the adapter ring 276 such that the base ring member 282 is fixedly connected to the rotor ring 236. At the connections of the inner 278 and outer ring member 280 are formed perpendicularly projecting lateral rails 286. Similarly, at the connections of the outer 280 and base ring members 282 are formed perpendicularly projecting longitudinal rails 288. A torque rotor 290 is fixedly connected to the inner ring member 278, and the torque rotor 290 engages and is fixedly secured to the second adapter 186 of the torsion bar 168 such that a rotation of the torsion bar 168 about the z axis results in an equal rotation of the torque rotor 290, coupling 240, and rotor ring 236.

The base ring member 282 may be secured to the adapter ring 276 with an adhesive (not shown). To further aid in the securement, the base ring member 282 may provided with a plurality of slots 291 which allow any excess adhesive to escape the interface of the base ring member 282 and adapter ring 276. In a similar fashion, the inner ring member 278 may include a plurality of slots 291 to further aid in the securement of the inner ring member 278 to the torque rotor 290. In addition, the inner ring member 278 includes a plurality of fingers 292 extending outwardly which fasten onto an inner wall 294 of the torque rotor 290.

The coupling 240 is preferably made from a single piece of flexible metal such as a sheet of stainless steel, and the pattern is formed by photo etching the sheet. The pattern may also be formed by a stamping process. The rails 286, 288 are formed by folding lengths of metal 286', 288' upwardly. The lateral rails 286 are rigid along the x axis but flexible along the y axis, and the longitudinal rails 288 are rigid along the y axis but flexible along the x axis. Accordingly, when the torsion bar 168 is secured to the inner ring member 278 and when the base ring member 282 is secured to the rotor ring 236, the torsion bar 168 may move with respect to the base ring member 282 in the x-y direction of the x-y plane. More specifically, the torsion bar 168 may move with respect to the base ring member 282 along the x axis through the flexing of the longitudinal rails 288 (with both the inner 278 and outer ring member 280 moving with the torsion bar 168), and the torsion bar 168 may move with respect to the base ring member 282 along the y axis through the flexing of the lateral rails 286 (with the inner ring member 278 moving with the torsion bar 168). In the embodiment illustrated in the drawings, it is contemplated that a force of about three ounces directed in the x-y direction should deflect the inner ring member about fifteen mils in the x-y direction. Of course, the coupling may be designed with differing spring characteristics which are more appropriate for a specific application.

The torsion bar 168, however, is not able to rotate with respect to the secured base ring member 282 about the z axis because of the collective rigidity of the rails 286, 288 in the x-y plane. In other words, in order for the torsion bar 168 to rotate about the z axis, the base ring member 282 also needs to rotate. Because of the rigidity in the x-y plane, any rotation of the torsion bar 168 will be translated into rotation of the base ring member 282. Accordingly, hysteresis is minimized or substantially eliminated between the torsion bar 168 and the base ring member 282 in terms of rotation about the z axis. Thus, the coupling 240 allows the torque sensing unit to accurately measure the rotation of the torsion bar 168 relative to the primary bar 166.

In the particular embodiment shown in the drawings and herein described, the housing 188, rear lid 190, position rotor 194, rotor ring 236, and torque rotor 290 are each formed of a substantially solid and continuous construction. Preferably, each of these elements are molded from a high impact and high temperature stable material such as LFL-4036 or RTP 4005TFE15 (30% glass, 15% PTFE, PPA). It should be noted that other materials exhibiting similar qualities may also be used. In addition, the position and torque substrate may be formed from non-ceramic materials such as a printed circuit boards (PCB), printed wiring board (PWB), polyglass substrate, or any other type known in the art. The slip rings, resistive rings, resistive patterns, and termination patterns may be formed by non-thick film processes such as thin film processes utilizing photolithographic techniques or the like.

Figure 18A:
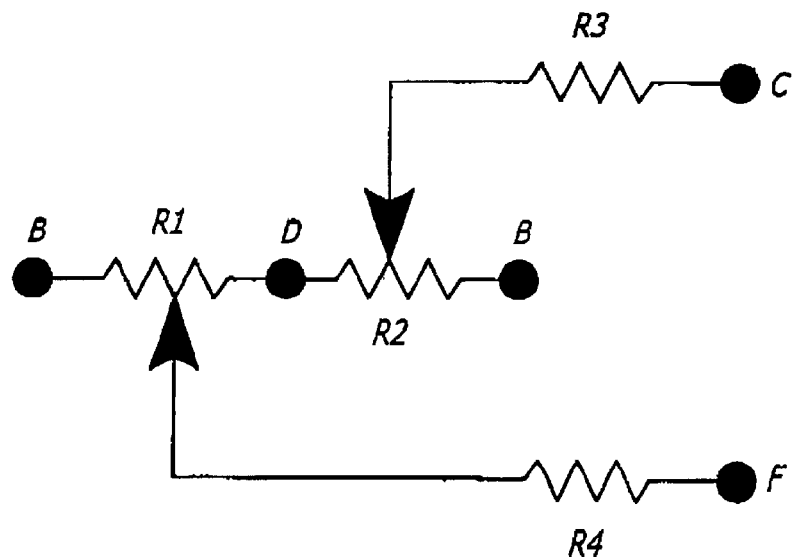
FIG. 18A is a schematic circuit of a circular potentiometer for an angular-position sensing unit.

FIGS. 18A illustrates a schematic circuit of the circular potentiometer for the angular-position sensing unit of the sensor assembly 156. The circular potentiometer comprises variable resistors R1 and R2, resistors R3 and R4, and terminals B, C, D, and F. The circular potentiometer may measure over an angular range $-90 \leq T < 270$, where T is the rotation angle in degrees. Let Vout(T) represent the output voltage which varies as a function of the rotation angle T, and Vin represent the input voltage. By measuring output voltages Vout(M) at terminals C and F, the controller can determine the angular position of the primary bar. The output voltage Vout(T) at terminal C is given by:

$$Vout(T) = Vin \cdot (0.5 + T/180) \quad \text{where} \quad -90 \leq T \leq 90$$

$$Vout(T) = Vin \cdot ((270 - T)/180) \quad \text{where } 90 < T < 270$$

The output voltage Vout(T) at terminal F is given by:

$$Vout(T) = Vin \cdot (T/180) \text{ where } 0 \leq T \leq 180$$

$$Vout(T) = Vin \cdot (360-T)/180 \text{ where } 180 < T < 360$$

Figure 18B:
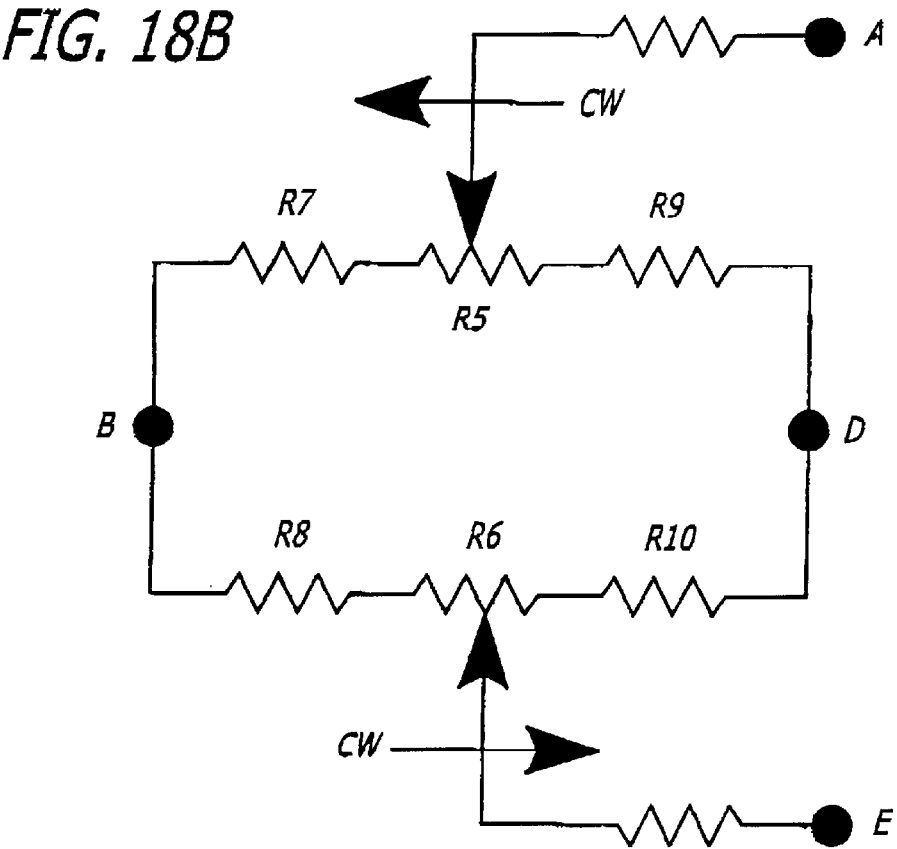
FIG. 18B is a schematic circuit of a potentiometer for a torque sensing unit.

FIG. 18B illustrates a schematic of the potentiometer for the torque sensing unit of the sensor assembly. The potentiometer comprises variable resistors R5 and R6, resistors R7–R10, and terminals A, B, D and E. The potentiometer may measure the rotation of the torsion bar 168 relative to the primary bar 166 over an angular range of $-8 \leq S \leq 8$, where S is the relative rotation angle in degrees. Let Vout(S) be the output voltage as a function of the relative rotation angle S, and Vin represent the input voltage. By measuring output voltages Vout(S) at terminals E and A, the controller can determine the relative rotation angle S. The voltage output Vout(S) at terminal E is given by:

$$Vout(S) = Vin \cdot (0.90 - 0.8(S+8)/16) \quad \text{where } S - 8$$

$$Vout(S) = 0.90 Vin \qquad \text{where } S < -8$$

$$Vout(S) = 0.10 Vin \qquad \text{where } S < -8$$

The voltage output Vout(S) at terminal A is given by:

$$Vout(S) = Vin \cdot (0.90 - 0.8(S+8)/16) \quad \text{where } -8 \leq S \leq 8$$

$$Vout(S) = 0.90 Vin \qquad \text{where } S < -8$$

$$Vout(S) = 0.10 Vin \qquad \text{where } S > 8$$

In operation, when the operator turns the steering wheel 152, the resulting torque input torsionally flexes the torsion bar 168. The rotor ring 236 rotates relative to the position rotor 194 such that the first 238a, second 238b, third 238c, and fourth torque sensor brush 238d respectively slide along the first 250, second 252, third 254, and fourth resistive pattern 256 of the torque element. The resistance from each resistive pattern 250, 252, 254, 256 depends on the location each torque sensor brush 238a, 238b, 238c, 238d contacts their respective resistive pattern 250, 252, 254, 256. The operating range of the torque sensing unit is from −8 to +8 degrees, and the output voltage Vout(S) resulting from the potentiometer is a function of the resistances obtained from the first 250, second 252, third 254, and fourth resistive pattern 256. For example, if the controller 159 measures output voltage Vout(S)=0.7Vin at terminal E and output voltage Vout(S)=0.3Vin at terminal A, the controller 159 will determine that the angular position of torsion bar 168 relative to the angular position of the primary bar 166 is +4 degrees. With this information, the controller 159 can determine the magnitude of the torque input and send the appropriate bias and power to the servo motor 160 so that the electronic power steering system 150 provides the appropriate rotational direction and level of power assistance to aid in steering. If the output voltage Vout(S) at terminal E does not correlate with the output voltage Vout(S) at terminal A, the controller 159 should terminate power assistance to the steering system for safety purposes.

As the operator turns the steering wheel 152, the primary bar 166 also rotates due to the torque input on the primary bar 166. The position rotor rotates 194 relative to the element assembly 192 such that the first 196a and second position sensor brush 196b respectively slide along the third 210 and fourth resistive ring 212 of the element assembly 192, and the third 196c and fourth position sensor brush 196d slide along the fifth resistive ring 214 of the element assembly 192. The resistance from each variable resistor ring 206, 208, 210, 212, 214 depends on the location each position rotor brush contacts their respective resistive ring 206, 208, 210, 214. The angular-position sensing unit can determine the angular position over an angular range $-90 \leq T$ 360, and the output voltage resulting from the circular potentiometer is a function of the resistances from the third 210, fourth 212, and fifth resistive ring 214. For example, if the controller measures output voltage Vout(T)=0.94Vin at terminal C and output voltage Vout(T)=0.44Vin at terminal F, the controller 159 will determine that the angular position of the primary bar 166 is +80 degrees. With this information, the controller 159 can send the appropriate bias and power to the servo motor 160 so that the electronic power steering system 150 provides the appropriate rotational direction and level of power assistance to aid in steering. In a similar fashion, the controller 159 should terminate power assistance if the output voltage Vout(T) at terminal C does not correlate with the output voltage Vout(T) at terminal F.

The circuits described hereinabove for the potentiometers are one operative preferred circuits, but other known potentiometer circuits could be used instead of the particular circuits described hereinabove.

Although the present invention has been described in detail with regarding the exemplary embodiments and drawings thereof, it should be apparent to those skilled in the art that various adaptations may be accomplished without departing from the spirit and scope of the invention. Accordingly, the invention is not limited to the precise embodiment shown in the drawings and described in detail hereinabove.

What is claimed is:

1. A method for accommodating axial displacement between two elongated members, comprising:

coupling an inner member to an outer member with first rails;

coupling a first elongated member to the inner member, the first elongated member having a first longitudinal axis;

allowing the inner member and the first elongated member to be readily displaced relative to the outer member only in a direction perpendicular to a longitudinal axis of the first rails;

connecting a base member to the outer member with second rails, the second rails being substantially perpendicular to the first rails;

allowing the outer member to be readily displaced relative to the base member only in a direction perpendicular to a longitudinal axis of the second rails;

fixedly connecting a second elongated member to the base member, the second elongated member having a second longitudinal axis, the first longitudinal axis differing from the second longitudinal axis; and allowing the first elongated member to rotate relative to the second elongated member while allowing the first elongated member to be displaced in an x-y direction along an x-y plane parallel to a surface of the base member.

2. The method of claim 1, further comprising:

connecting the first elongated member to the second elongated member; and torsionally flexing the first elongated member relative to the second elongated member such that a portion of the first elongated member rotates relative to the second elongated member.

3. The method of claim 1, further comprising:

forming the inner member, the outer member, the first rails and the second rails as an integral unit.

4. The method of claim 1, wherein the first elongated member and the second elongated member are shafts.

5. A method of coupling a shaft with low-hysteresis, comprising:

configuring a shaft having a first portion nominally coaxial to a second portion, the first portion torsionally flexible relative to the second portion such that the first portion rotates relative to the second portion;

fixedly connecting an inner member to the first portion of the shaft;

connecting the inner member to an outer member with first rails, the first rails being substantially perpendicular to an axis, and the first rails allowing the inner member and the first portion of the shaft to be readily displaced relative to the outer member only in a direction parallel to the axis;

connecting the outer member to a base member with second rails, the base member disposed outside the outer member, the second rails being substantially perpendicular to the axis, and the second rails allowing the outer member and the second shaft to be readily displaced relative to the base member only in a direction substantially perpendicular to the axis;

rotatively coupling the base member to the second portion of the shaft;

fixedly connecting the base member to the second portion of the shaft in the x and y direction of a x-y plane parallel to a top surface of the base member;

allowing the inner member to move relative to the base member along an x and y direction of the x-y plane such that the inner member freely moves along the x-y plane to connect with the first shaft; and rotatively fixing the inner member relative to the base member.

6. The method of claim 5, wherein a diameter of the first portion of the shaft is substantially less than a diameter of the second portion of the shaft to allow the first portion of the shaft to torsionally rotate relative to the second portion of the shaft when a torque acts on the first portion of the shaft.

7. The method of claim 6, wherein the first portion of the shaft is a torsion bar for a motor vehicle, and the second portion of the shaft is a primary bar having a pinion.

8. A method of coupling with a low-hysteresis, comprising:

coupling an inner member to an outer member with first rails, the first rails allowing the inner member to be readily displaced relative to the outer member only in a direction substantially perpendicular to a longitudinal axis of the first rails;

coupling the outer member to a base member with second rails, the base member disposed outside the outer member, the second rails oriented perpendicularly to the first rails, the second rails allowing the outer member to be readily displaced relative to the base member only in a direction substantially perpendicular to a longitudinal axis of the second rails;

allowing the inner member to move freely in an x-y direction relative to the base member in an x-y plane parallel to the longitudinal axis of the first rails and the second rails; and rotatively fixing the inner member relative to the base member.

9. The method of claim 8, further comprising:

deflecting the inner member about 15 mils in the x-y direction by directing a force of about 3 ounces in the x-y direction.

10. The method of claim 9, further comprising:

forming the inner member, the outer member, the first rails, the second rails and the base member as an integral unit.

11. The method of claim 10, further comprising:

photo-etching a metallic sheet to form the inner member, the outer member, the first rails, the second rails and the base member.

12. The method of claim 10, further comprising:

stamping a metallic sheet to form the inner member, the outer member, the first rails, the second rails and the base member.

13. The method of claim 8, further comprising:

forming the inner member as an annular ring; and forming the outer member as an annular ring.

14. The method of claim 8, further comprising:

connecting the first rails to the inner member with connectors, each connector having a width substantially less than a length of the first rails, the connectors disposed near a mid-length of the first rails to allow the inner member to be readily displaced relative to the outer member only in a direction parallel to the axis wherein the first rails and the second rails deflect in a spring-like manner in a direction perpendicular to the length of the first rails.

15. The method of claim 8, further comprising:

disposing a first of the first rails on one end of the inner member and disposing a second of the first rails on an opposite end of the inner member; and disposing a first of the second rails on one end of the outer member and disposing a second of the second rails on an opposite end of the outer member.

16. The method of claim 8, wherein the inner member, the outer member and the base member form a planar surface, wherein each of the first rails and each of the second rails form additional planar surfaces, wherein the additional planar surfaces are oriented substantially perpendicular to the planar surface of the inner member, the outer member and the base member.

17. A method of low-hysteresis coupling a first member that rotates about a first axis to a second member that rotates about a second axis, comprising:

forming the first member with a first set of at least two longitudinal members, the first set of at least two longitudinal members being substantially parallel to one another and substantially perpendicular to the first axis of the first member; and forming the second member with a second set of at least two longitudinal members, the second set of at least two longitudinal member being substantially parallel to one another and substantially perpendicular to the second axis of the second member, and the second set of at least two longitudinal members being substantially perpendicular to the first set of at least two longitudinal members.

18. The method of claim 17, further comprising:

coupling the second set of at least two longitudinal member with a base member, the first set of at least two longitudinal members being readily displaceable relative to the base member in a direction perpendicular to a longitudinal axis of the first set of at least two longitudinal members, and the second set of at least two longitudinal members being readily displaceable relative to the base member in a direction perpendicular to a longitudinal axis of the second set of at least two longitudinal members.

19. The method of claim 18, further comprising:

connecting the first set of at least two longitudinal members to the first member with tabs to allow the first member to be readily displaceable relative to the base member, the tabs having a width substantially less than a length of each of the longitudinal members of the first set, and the tabs being disposed near a mid-length of each of the longitudinal members of the first set; and connecting the second set of at least two longitudinal members to the second member with additional tabs to allow the second member to be readily displaceable relative to the base member, the additional tabs having a width substantially less than a length of each of the longitudinal members of the second set, and the additional tabs being disposed near a mid-length of each of the longitudinal members of the second set.

20. The method of claim 19, further comprising:

forming the first set of at least two longitudinal members, the second set of at least two longitudinal members, base member, tabs and additional tabs as an integral unit.

21. The method of claim 19, further comprising:

forming the first set of at least two longitudinal members, the second set of at least two longitudinal members, base member, tabs and additional tabs as an integral unit by photo-etching a metallic sheet.

22. The method of claim 19, further comprising:

forming the first set of at least two longitudinal members, the second set of at least two longitudinal members, base member, tabs and additional tabs as an integral unit by stamping a metallic sheet.

23. The method of claim 17, wherein the first member and the second member are elongated members.

24. The method of claim 20, wherein the elongated members are shafts.

25. The method of claim 17, wherein the first member and the second member are each annular rings.

26. A method of sensing rotation of a member with low-hysteresis, comprising:

rotating a first member having a first electrical contact on one side and a first resistive element on a second side, the first electrical contact slidingly contacting a second resistive element;

rotating a second member relative to the first member, the second member having a second electrical contact on a first side, the second electrical contact slidingly contacting the first resistive element; and providing the second member with a coupling, the coupling comprising:

an inner member fixedly connected to a first elongated member having a first longitudinal axis;

an outer member;

first rails connecting the inner member to the outer member, the first rails allowing the inner member and the first elongated member to be readily displaced relative to the outer member only in a direction substantially perpendicular to a longitudinal axis of the first rails;

a base member disposed outside the outer member, the base member fixedly coupled to the second member;

second rails connecting the outer member to the base member, the second rails oriented substantially perpendicularly to the first rails, the second rails allowing the outer member to be readily displaced relative to the base member only in a direction substantially perpendicular to a longitudinal axis of the second rails; and a second elongated member having a second longitudinal axis, the first longitudinal axis differing from the second longitudinal axis, and the second elongated member fixedly coupled to the first member;

measuring an output voltage dependent upon the second resistive element to determine a rotational position of the second elongated member; and measuring an output voltage dependent upon the first resistive element to determine the rotational position of the first elongated member relative to the second elongated member.

27. The method of claim 26, further comprising:

connecting the first elongated member to the second elongated member; and measuring a rotational position of the first elongated member relative to the second elongated member to measure torsion resulting from an input torque acting on the first elongated member.

28. The method of claim 26, further comprising:

wherein the first elongated member is a torsion bar and the second elongated member is a primary bar for a motor vehicle;

coupling one end of the torsion bar to a steering wheel of the motor vehicle and another end of the torsion bar to one end of the primary bar;

coupling another end of the primary bar to a steering rack of the motor vehicle.

29. The method of claim 26, further comprising:

wherein the first resistive element is a thick film resistive material; and forming the thick film resistive material on a substrate.

30. A method of sensing rotation with low-hysteresis for an angular position and torque sensor assembly, comprising:

providing a column shaft having a primary bar and a torsion bar;

coupling the primary bar with the torsion bar, comprising:
fixedly connecting an inner member to the torsion bar;
coupling the inner member to an outer member with first rails, the first rails allowing the inner member to be readily displaced relative to the outer member only in a direction substantially perpendicular to a longitudinal axis of the first rails;

fixedly connecting a base member to the primary bar;

coupling the outer member to the base member with second rails, the base member disposed outside the outer member, the second rails oriented perpendicularly to the first rails, the second rails allowing the outer member to be readily displaced relative to the base member only in a direction substantially perpendicular to a longitudinal axis of the second rails;

allowing the inner member to move freely in an x-y direction relative to the base member in an x-y plane parallel to the longitudinal axis of the first rails and the second rails; and rotatively fixing the inner member relative to the base member;

determining an angular position of the column shaft by measuring an angular position of the primary bar using a first potentiometer; and determining torque on the column shaft by measuring an angular position of the torsion bar relative to the angular position of the primary bar using a second potentiometer.

31. The method of claim 30, further comprising:

wherein said determining an angular position of the column shaft includes rotating a first member having a first electrical contact on one side and a first resistive element on a second side, the first electrical contact slidingly contacting a second resistive element; and wherein said determining torque on the column shaft includes rotating a second member relative to the first member, the second member having a second electrical contact on a first side, the second electrical contact slidingly contacting the first resistive element.

32. The method of claim 31, further comprising:

measuring an output voltage dependent upon the first resistive element to determine a rotational position of the primary bar; and measuring an output voltage dependent upon the second resistive element to determine the rotational position of the torsion bar relative to the primary bar.

33. The method of claim 30, further comprising:

forming the inner member, the outer member, the first rails, the second rails and the base member as an integral unit.

* * * * *